United States Patent [19]

Iida et al.

[11] 4,443,552

[45] Apr. 17, 1984

[54] CATALYSTS FOR THE CATALYTIC CRACKING OF HEAVY OIL

[75] Inventors: Hiroshi Iida; Akira Iino, both of Sodegaura; Kosaku Honna, Ichihara, all of Japan

[73] Assignee: Idemitsu Kosan Co., Ltd., Tokyo, Japan

[21] Appl. No.: 408,441

[22] Filed: Aug. 16, 1982

[30] Foreign Application Priority Data

Aug. 24, 1981 [JP] Japan ................................ 56-131622
Sep. 14, 1981 [JP] Japan ................................ 56-145015

[51] Int. Cl.$^3$ ............................................. B01J 29/14
[52] U.S. Cl. ........................................ 502/66; 502/74
[58] Field of Search ................. 252/455 Z; 502/66, 74

[56] References Cited

U.S. PATENT DOCUMENTS

| | | | |
|---|---|---|---|
| 3,013,990 | 12/1961 | Breck et al. ..................... | 252/455 Z |
| 3,255,101 | 6/1966 | Arey, Jr. et al. ................ | 252/455 Z |
| 3,335,099 | 8/1967 | Weisz ............................. | 252/455 Z |
| 3,337,474 | 8/1967 | Cornelius et al. ............... | 252/455 Z |
| 3,766,056 | 10/1973 | Young ............................. | 252/455 Z |

*Primary Examiner*—Carl F. Dees
*Attorney, Agent, or Firm*—Frishauf, Holtz, Goodman & Woodward

[57] ABSTRACT

The invention provides catalysts for the catalytic cracking of heavy oil, comprising an iron-containing crystalline aluminosilicate zeolite. This crystalline aluminosilicate zeolite is obtained by treating a raw crystalline aluminosilicate zeolite material with an acidic solution containing iron ions, or alternatively, by applying a steam treatment and, thereafter, treating with an acidic solution containing iron ions. The use of the catalyst provides a gasoline fraction having a high octane value and an intermediate fraction from heavy oil in high yield.

12 Claims, No Drawings

CATALYSTS FOR THE CATALYTIC CRACKING OF HEAVY OIL

BACKGROUND OF THE INVENTION

1. Field of the Invention

The present invention relates to catalysts for the catalytic cracking of heavy oil. More particularly, it relates to catalysts for use in catalytic cracking of heavy oil, comprising crystalline aluminosilicate zeolites prepared by treating with an acidic solution containing iron ions.

2. Description of the Prior Art

Silica-alumina compounds have been widely used as catalysts for fluid catalytic cracking. Particularly, in recent years, the use of catalysts comprising silica-alumina or alumina blended with zeolite has increased because of their high cracking activity and durability. The catalysts have the disadvantage that they produce a gasoline fraction having only a low octane value, although they exhibit high cracking activity in catalytic cracking of heavy oil. Furthermore, an intermediate fraction including kerosene and light oil cannot be obtained in a sufficiently high yield. The recent oil situation has resulted in the intermediate fraction being in short supply. It has been desired to develop new catalysts, particularly catalysts which produce the intermediate fraction in a high yield.

THE INVENTION

It is an object of the invention is to provide catalysts suitable for use in catalytic cracking of heavy oil.

Another object of the invention is to provide catalysts for catalytic cracking of heavy oil which produce a gasoline fraction having a high octane value and an intermediate fraction including kerosene and light oil each in a high yield.

The present invention provides catalysts for the catalytic cracking of heavy oil, comprising (1) a crystalline aluminosilicate zeolite prepared by treating a crystalline aluminosilicate zeolite with an acidic solution containing iron ions (referred to hereinafter as the "Fe zeolite") or (2) a crystalline aluminosilicate zeolite prepared by treating with steam and treating with an acidic solution containing iron ions (this zeolite is hereinafter referred to as "FeS zeolite").

Zeolites of varied compositions may be used as the raw (starting) zeolite materials for the preparation of the Fe zeolite and the FeS zeolite of the invention. Usually, zeolites in which the molar ratio of silica to alumina is at least 4.6/1 and the $Na_2O$ content is 2.4% by weight or less and preferably 1% by weight or less, are used. In more detail, natural zeolites, such as faujasite and mordenite, and synthetic zeolites, such as X-type zeolite, Y-type zeolite, L-type zeolite, and ZSM-type zeolite, can be used.

The Fe zeolite in the catalysts of the invention is prepared by treating the raw zeolite material with an acidic solution containing iron ions and, thereafter, dried and heated (fired) under the usual conditions. Acidic solutions containing iron ions, such as solutions containing iron salts or complex salts can be used. Generally, aqueous solutions of ferrous chloride, ferric chloride, ferric nitrate, ferrous sulfate, ferric sulfate, etc., are used. It is required that the acidic solution is adjusted in pH to the acidic region, preferably to 2 or less, and more preferably to 1.5 or less. The pH of the iron ion-containing acidic solution can be adjusted to the acidic region by adding acid such as hydrochloric acid, nitric acid, sulfuric acid, etc.

Treating the above-described raw zeolite material with an acidic solution containing iron ions can be performed by various techniques. Usually the raw zeolite material is soaked in the iron ion-containing solution at a temperature of from 0° to 100° C. for a period of from 0.5 to 10 hours. It is also effective to stir the solution or to agitate the solution with supersonic waves. Although the iron ion content of the Fe zeolite is not critical, it is preferably from 2 to 20% by weight (as calculated as $Fe_2O_3$).

In the preparation of FeS zeolite in the catalyst of the invention, the raw zeolite material is treated with steam prior to the treatment with the aforedescribed acidic solution containing iron ions. This steam treatment is achieved by heat-treating the raw zeolite material in the presence of steam at a temperature of from 500° to 900° C. for a period of from about 1 to 10 hours. In this steam treatment, the steam may be added from outside, or alternatively the water contained in the raw zeolite material can be converted into steam. In the latter case, so-called self-steaming occurs.

In a variant of the FeS zeolite, after the steam treatment, an acid treatment is applied to remove aluminum and, thereafter, the raw zeolite material is treated with the iron ion-containing acidic solution, and then dried and heated.

The thus-prepared Fe zeolites and FeS zeolites contain iron in the interior thereof, and at least a part of the iron is bound to aluminosilicate in a form other than an ion bonding. In this respect, the Fe zeolite and FeS zeolite in the catalyst of the invention are significantly different in crystal structure, catalytic activity, etc. from the conventional iron-containing aluminosilicates. Although the form in which at least a part of the iron is bound to aluminosilicate, i.e., in a form other than ionic bonding, is not yet clear, it is considered that aluminium contained in the crystal is eluted (removed) during its contact with an acidic, particularly strongly acidic aqueous iron salt solution, and in place of the eluted aluminum, the iron approaches the position from which the eluted aluminum has been removed and forms a strong bond whereby it is incorporated into the crystal. In the Fe zeolite and FeS zeolite, the iron content is high and the aluminum content is low, compared with the conventional iron-containing zeolites. In general, the molar ratio of $SiO_2$ to $Al_2O_3$ is from 4.6 to 200 and the $Fe_2O_3$ content is from 2 to 20% by weight.

The catalysts of the invention are solid catalysts comprising the Fe zeolite or FeS zeolite as prepared by the aforedescribed treatment, which are suitable for use in catalytic cracking of heavy oil. Generally, inorganic oxides can be contained in the catalysts of the invention, if necessary. Inorganic oxides as used herein are porous inorganic oxides which are used in the usual catalytic cracking, i.e., catalyst adjuvants or supports. In more detail, aluminas, such as boehmite gel and alumina sol, and silicas, such as silica sol, and silica-alumina can be used.

The ratio of the Fe zeolite or FeS zeolite to the inorganic oxide is determined depending on the specific type of (i) zeolite and (ii) inorganic oxide, and the purpose for which the ultimate catalyst is used. Usually, the mixing ratio should be chosen within the range of zeolite/inorganic oxide = 3/97 to 70/30 (by weight).

The catalysts of the invention are, as described hereinbefore, suitable for catalytic cracking of heavy oil.

Heavy oils which are used for catalytic cracking in the presence of the catalysts of the invention are not critical, and various heavy oils can be used. In general, atmospheric distillation residue of crude oil, vacuum distillation residue, heavy light-oil, vacuum light-oil, shale oil, and hydrocarbon oil resulting from tar sand bitumen can be used.

In the catalytic cracking of heavy oil in the presence of the catalysts of the invention, a wide variety of reaction conditions can be employed which have conventionally been employed in catalytic cracking. Although the actual reaction conditions vary depending on the type of feed oil and cannot be determined unconditionally, it is usually preferred that the reaction temperature is from 400° to 650° C. and the reaction pressure is from reduced pressure to several hundred atmospheric pressures.

The use of the catalysts of the invention provides gasoline having a high octane value from heavy oil in a high yield compared with the use of conventional catalysts and, furthermore, increases the yield of an intermediate fraction including kerosene, light oil, etc. and reduces the amount of coke which is formed. Since the catalysts of the invention have high heat resistance, metal resistance, and sulfur resistance, they retain their high catalytic activity over a long period of time even if they are used in catalytic cracking under severe conditions.

Thus, the catalysts of the invention can be effectively utilized in the field of petroleum refining.

The following examples are given to illustrate the invention in greater detail.

EXAMPLE 1

A mixture of 100 grams of crystalline aluminosilicate zeolite (Y-type zeolite) having a $Na_2O$ content of 0.4% by weight and a $SiO_2/Al_2O_3$ molar ratio of 5.6, and 800 milliliters of a 0.25 mole per liter aqueous solution of $Fe(NO_3)_3$ was placed in a 1-liter three-necked flask, stirred at 50° C. for 2 hours, and then was subjected to suction filtration. The residue was then fully washed with 10 liters of water maintained at 50° C., dried at 50° C. for 4 hours, and subsequently heated at 500° C. for 3 hours to obtain iron-containing crystalline aluminosilicate zeolite ($Na_2O$ content: 0.25% by weight; $SiO_2/Al_2O_3$ molar ratio: 10.3; $SiO_2/Fe_2O_3$ molar ratio: 26.2).

An aqueous aluminum chloride solution and 3 times as many moles of an aqueous sodium hydroxide solution were reacted to form an aluminum hydroxide precipitate. The precipitate was then aged at 90° C. for 10 hours to obtain a boehmite gel.

A mixture of 100 grams of the above-prepared iron-containing crystalline aluminosilicate zeolite (Fe-HY zeolite), 960 grams of the above-prepared boehmite gel, and 3,300 grams of silica sol (produced by Nissan Kagaku Co., Ltd. under the trade name of Snowtex-O) was kneaded, molded in a diameter of 1 millimeter by the use of a wet extrusion molding apparatus, dried at 120° C. for 3 hours, and heated at 500° C. for 3 hours to prepare a Fe-HY zeolite—$Al_2O_3$—$SiO_2$ catalyst having a Fe-HY zeolite content of 10.3% by weight. The specific surface area of the catalyst was 240 square meters per gram.

Then, 4 grams of the above-prepared catalyst was charged into a glass reaction tube, through which 1 milliliter of desulfurized vacuum light oil (specific gravity (15/4° C.): 0.8805; boiling point range: 256° to 579° C.; sulfur content: 0.15%) was passed at 482° C. and 1 atmospheric pressure over a period of 190 seconds (LHSV: 4 per hour ($hr^{-1}$)) to perform catalytic cracking. The results are shown in Table 1.

COMPARATIVE EXAMPLE 1

Catalytic cracking of desulfurized vacuum light oil was performed under the same conditions as in Example 1 except that crystalline aluminosilicate zeolite (Y-type zeolite) having a $Na_2O$ content of 0.4% by weight and a $SiO_2/Al_2O_3$ molar ratio of 5.6 was used in place of the Fe-HY zeolite. The results are shown in Table 1.

COMPARATIVE EXAMPLE 2

Iron was deposited on 100 grams of crystalline aluminosilicate zeolite (Y-type zeolite) having a $Na_2O$ content of 0.4% by weight and a $SiO_2/Al_2O_3$ molar ratio of 5.6 by an impregnation technique. In this case, the deposition of iron on the zeolite was achieved by impregnating the zeolite with a solution which had been prepared by dissolving 64 grams of $Fe(NO_3)_3.9H_2O$ in ion-exchanged water and made to 40 milliliters. Thereafter, the zeolite was dried at 50° C. for 4 hours and subsequently heated at 500° C. for 3 hours to obtain iron-deposited crystalline alumino-silicate zeolite ($Na_2O$ content: 0.4% by weight; $SiO_2/Al_2O_3$ molar ratio: 5.6/1; $Fe_2O_3$ content: 11.3% by weight).

Catalytic cracking of desulfurized vacuum light oil was performed under the same conditions as in Example 1 except that the above-prepared iron-deposited crystalline aluminosilicate zeolite was used in place of the Fe-HY zeolite. The results are shown in Table 1.

TABLE 1

| | Example 1 | Comparative Example 1 | Comparative Example 2 |
|---|---|---|---|
| Products (% by weight) | | | |
| Hydrogen | 1.6 | 0.3 | 0.9 |
| $C_1$ to $C_4$ Hydrocarbons | 18.6 | 20.5 | 16.0 |
| Gasoline | 48.0 | 43.0 | 43.8 |
| Light Light-Oil | 20.8 | 16.3 | 21.2 |
| Heavy Light-Oil | 1.5 | 5.4 | 4.2 |
| Coke | 9.5 | 14.5 | 13.9 |
| Conversion (% by weight) | 77.7 | 78.3 | 74.6 |
| Octane Value of Gasoline (RON) | 93.6 | 92.5 | 92.4 |

EXAMPLE 2

Four hundred grams of crystalline aluminosilicate zeolite (HY-type zeolite) having a $Na_2O$ content of 0.4% by weight and a $SiO_2/Al_2O_3$ molar ratio of 5.6 was placed in a batch rotary kiln (inner diameter: 100 millimeters; length: 60 centimeters and raised in temperature to 220° C. by heating by the use of a heater over a period of 100 minutes while rotating the kiln. The zeolite was maintained at 220° C. for 2 hours and subsequently raised in temperature to 810° C. over a period of 3 hours, at which temperature self-steaming was performed for 3 hours. Thereafter, the zeolite was allowed to cool to obtain steam treated HY-type zeolite (SHY zeolite).

Then, 200 grams of the above-prepared SHY zeolite was placed in a 2-liter three-necked flask made of glass, and 1.6 liters of a 0.1 mole per liter aqueous $Fe(NO_3)_3$ solution which had been adjusted to pH 0.8 with nitric acid was added thereto. The resulting mixture was stirred at 50° C. for 2 hours and was subjected to suction filtration. The residue was washed with 20 liters of water maintained at 50° C., dried at 50° C. for 4 hours, and subsequently heated at 500° C. for 3 hours to obtain iron-containing zeolite (FeSHY zeolite). In this iron-containing zeolite, the $SiO_2/Al_2O_3$ molar ratio was 13.2/1 and the $SiO_2Fe_2O_3$ molar ratio was 46.2/1.

A mixture of 50 grams of the above-prepared FeSHY zeolite and 870 grams of the same boehmite gel as obtained in Example 1 was kneaded and molded in a diameter of 1 millimeter by the use of a wet extrusion molding apparatus, and subsequently dried at 120° C. for 3 hours and heated at 500° C. for 3 hours to prepare a FeSHY zeolite-alumina catalyst having a FeSHY zeolite content of 20.3% by weight. The specific surface area of the catalyst was 252 square meters per gram.

Using 4 grams of the above-prepared catalyst, catalytic cracking of desulfurized vacuum light oil was performed under the same conditions as in Example 1. The results are shown in Table 2.

COMPARATIVE EXAMPLE 3

A mixture of 50 grams of the SHY zeolite as prepared in Example 2 and 870 grams of the boehmite gel as prepared in Example 1 was kneaded and molded in a diameter of 1 millimeter by the use of a wet extrusion molding apparatus, and subsequently dried at 120° C. for 3 hours and further heated at 500° C. for 3 hours to prepare a SHY zeolite-alumina catalyst having a SHY zeolite content of 20.3% by weight.

Using 4 grams of the above-prepared catalyst, catalytic cracking of desulfurized vacuum light oil was performed under the same conditions as in Example 1. The results are shown in Table 2.

COMPARATIVE EXAMPLE 4

A 2-liter three-necked flask made of glass was charged with 100 grams of the SHY zeolite as prepared in Example 2, and 1,000 milliliters of 0.2 normal hydrochloric acid was added thereto. The mixture was stirred at 95° C. for 2 hours to cancel the removal of aluminum, and then was subjected to suction filtration. The residue was then fully washed with 20 liters of water maintained at 50° C., dried at 120° C. for 3 hours and then heated at 500° C. for 3 hours to obtain de-aluminated zeolite (DAL). The $SiO_2/Al_2O_3$ molar ratio of DAL was 11.6/1.

A mixture of 50 grams of DAL as prepared above and 870 grams of boehmite gel as prepared in Example 1 was kneaded and molded in a diameter of 1 millimeter by the use of a wet extrusion molding apparatus, and subsequently dried at 120° C. for 3 hours and heated at 500° C. for 3 hours to prepare a DAL-alumina catalyst having a DAL content of 20.1% by weight.

Using 4 grams of the above-prepared catalyst, catalytic cracking of desulfurized vacuum light oil was performed under the same conditions as in Example 1. The results are shown in Table 2.

COMPARATIVE EXAMPLE 5

A 2-liter three-necked flask made of glass was charged with 200 grams of SHY zeolite as prepared in Example 2, and 1.6 liters of a 0.1 mole per liter aqueous $Ni(NO_3)_2$ solution which had been adjusted to pH 0.8 with nitric acid was added thereto. The resulting mixture was stirred at 50° C. for 2 hours and, thereafter, was subjected to suction filtration. The residue was then fully washed with 20 liters of water maintained at 50° C., dried at 50° C. for 4 hours, and subsequently heated at 500° C. for 3 hours to obtain Ni-containing zeolite (NiSHY zeolite). In this Ni-containing zeolite, the $SiO_2/Al_2O_3$ molar ratio was 11.7/1, and the $SiO_2/NiO$ molar ratio was 54.8/1.

A mixture of 50 grams of NiSHY zeolite was prepared above and 870 grams of boehmite gel as prepared in Example 1 was kneaded and molded in a diameter of 1 millimeter by the use of a wet extrusion molding apparatus, and subsequently was dried at 120° C. for 3 hours and further heated at 500° C. for 3 hours to prepare a NiSHY zeolite-alumina catalyst having a NiSHY content of 20.0% by weight.

Using 4 grams of the above-prepared catalyst, catalytic cracking of desulfurized vacuum light oil was performed under the same conditions as in Example 1. The results are shown in Table 2.

EXAMPLE 3

A three-necked flask was charged with 50 grams of FeSHY as prepared in Example 2, and 400 milliliters of a 0.25 mole per liter aqueous solution of lanthanum nitrate (adjusted to pH 2.0 by adding nitric acid) was added thereto. The resulting mixture was stirred at 80° C. for 5 hours to perform an ion exchange treatment. The mixture was then subjected to suction filtration. The residue was washed with 10 liters of water, dried at 120° C. for 3 hours, and subsequently heated at 500° C. for 3 hours to obtain a La-exchanged FeSHY zeolite (La.FESHY zeolite). In this La-exchanged FeSHY zeolite, the $La_2O_3$ content was 1.5% by weight, the $SiO_2/Al_2O_3$ molar ratio was 13.5/1, and the $SiO_2Fe_2O_3$ molar ratio was 49.8/1.

A mixture of 50 grams of La.FeSHY zeolite as prepared above and 870 grams of boehmite gel as prepared in Example 1 was kneaded and molded in a diameter of 1 millimeter by the use of a wet extrusion molding apparatus, and then dried at 120° C. for 3 hours and further heated at 500° C. for 3 hours to prepare a La.FeSHY zeolite-alumina catalyst having a La.FeSHY zeolite content of 20.0% by weight.

Using 4 grams of the above-prepared catalyst, catalytic cracking of desulfurized vacuum light oil was performed under the same conditions as in Example 1. The results are shown in Table 2.

EXAMPLE 4

400 Grams of crystalline aluminosilicate zeolite (HY-type zeolite) having a $Na_2O$ content of 0.4% by weight and a $SiO_2/Al_2O_3$ molar ratio of 5.6 was placed in the same batch rotary kiln as used in Example 2 and raised in temperature to 220° C. by heating by the use of a heater over a period of 100 minutes while rotating the kiln. The zeolite was maintained at 220° C. for 2 hours and subsequently raised in temperature to 540° C. over a period of 1.5 hours, at which temperature self-steaming was performed for 3 hours. Thereafter the zeolite was allowed to cool to obtain SHY zeolite.

Then, 150 grams of the above-prepared SHY zeolite was placed in a 2-liter three-necked flask made of glass, and 1,500 milliliters of 0.2 normal hydrochloric acid was added thereto. The resulting mixture was stirred at 95° C. for 2 hours, and then was subjected to suction filtration. The residue was fully washed with 20 liters of water maintained at 50° C. and dried at 120° C. for 3 hours to obtain DAL-1. Thereafter, the same self-steaming-hydrochloric acid treatment-drying procedure was repeated twice to obtain DAL-2 (the molar ratio of $SiO_2/Al_2O_3$: 7.6/1).

A 1-liter three-necked flask made of glass was charged with 100 grams of DAL-2 as prepared above, and 800 milliliters of a 0.25 mole per liter aqueous Fe(NO$_3$)$_3$ solution was added thereto. The resulting mixture was stirred at 50° C. for 2 hours, and then was subjected to suction filtration. The residue was washed with 10 liters of water maintained at 50° C., dried at 50° C. for 4 hours, and subsequently was heated at 500° C. for 3 hours to obtain iron-containing DAL (FeDAL). In this iron-containing DAL, the SiO$_2$/Al$_2$O$_3$ molar ratio was 14.0/1, and the SiO$_2$Fe$_2$O$_3$ molar ratio was 42.0/1.

A mixture of 50 grams of FeDAL as prepared above and 1,960 grams of boehmite gel as prepared in Example 1 was kneaded and molded in a diameter of 1 millimeter by the use of an extrusion molding apparatus, and then dried at 120° C. for 3 hours and further heated at 500° C. for 3 hours to prepare a FeDAL-alumina catalyst having a FeDAL content of 9.8% by weight.

Using 4 grams of the above-prepared catlayst, catalytic cracking of desulfurized vacuum light oil was performed under the same conditions as in Example 1. The results are shown in Table 2.

TABLE 2

|  | Example 2 | Comparative Example 3 | Comparative Example 4 | Comparative Example 5 | Example 3 | Example 4 |
|---|---|---|---|---|---|---|
| Products (% by weight) |  |  |  |  |  |  |
| Hydrogen | 1.7 | 0.4 | 0.3 | 1.5 | 1.5 | 1.6 |
| C$_1$ to C$_4$ Hydrocarbons | 20.1 | 20.1 | 21.3 | 12.2 | 21.8 | 17.1 |
| Gasoline Fraction*[1] | 49.4*[4] | 48.0 | 48.2*[5] | 41.5 | 49.6 | 47.4 |
| Light Light-Oil Fraction*[2] | 18.0 | 16.7 | 15.8 | 18.3 | 16.4 | 24.5 |
| Heavy Light-Oil Fraction*[3] | 2.0 | 2.6 | 2.4 | 10.9 | 1.7 | 1.6 |
| Coke | 8.8 | 12.2 | 12.0 | 15.6 | 9.0 | 7.8 |

*[1]Boiling point: 204° C. or less
*[2]Boiling point: 205-345° C.
*[3]Boiling point: 346° C. or more
*[4]Research octane value: 93.9
*[5]Research octane value: 93.1

What is claimed is:

1. An improved catalyst for the catalytic cracking of heavy oil comprising a crystalline aluminosilicate zeolite prepared by treating a starting aluminosilicate zeolite having a SiO$_2$/Al$_2$O$_3$ molar ratio of at least 4.6 and a Na$_2$O content of not more than 2.4% by weight with an acidic aqueous solution containing iron ions having a pH of 2 or less, whereby a part of the original aluminum content of said starting aluminosilicate zeolite is replaced by iron.

2. The catalyst of claim 1 wherein said starting aluminosilicate zeolite is immersed in said acidic aqueous solution.

3. The catalyst of claim 2 wherein the crystalline aluminosilicate zeolite contains between 2 and 20% by weight of iron calculated as Fe$_2$O$_3$.

4. The catalyst of claim 2 wherein said catalyst contains an inorganic oxide catalyst adjuvant.

5. The catalyst of claim 4 wherein the weight ratio of crystalline aluminosilicate zeolite to said inorganic oxide is between 3/97 and 70/30.

6. The catalyst of claim 4 wherein said inorganic oxide is a porous alumina, a porous silica, or a porous silica-alumina.

7. An improved catalyst for the catalytic cracking of heavy oil comprising a crystalline aluminosilicate zeolite prepared by treating a starting aluminosilicate zeolite having a SiO$_2$/Al$_2$O$_3$ molar ratio of at least 4.6 and a Na$_2$O content of not more than 2.4% by weight with steam and then treating said steam-treated zeolite with an acidic aqueous solution containing iron ions having a pH of 2 or less, whereby a part of the original aluminum content of said starting aluminosilicate zeolite is replaced by iron.

8. The catalyst of claim 7 wherein said starting aluminosilicate zeolite is immersed in said acidic aqueous solution.

9. The catalyst of claim 8 wherein the crystalline aluminosilicate zeolite contains between 2 and 20% by weight of iron calculated as Fe$_2$O$_3$.

10. The catalyst of claim 8 wherein said catalyst contains an inorganic oxide catalyst adjuvant.

11. The catalyst of claim 10 wherein the weight ratio of crystalline aluminosilicate zeolite to said inorganic oxide is between 3/97 and 70/30.

12. The catalyst of claim 10 wherein said inorganic oxide is a porous alumina, a porous silica, or a porous silica-alumina.

* * * * *